United States Patent [19]

Belohlawek

[11] Patent Number: 4,798,736

[45] Date of Patent: Jan. 17, 1989

[54] PROCESS AND PRODUCT OF MAKING A VEGETABLE PROTEIN HYDROLYSATE FOOD SEASONING

[75] Inventor: Lothar Belohlawek, Freising, Fed. Rep. of Germany

[73] Assignee: Diamalt Aktiengesellschaft, Munich, Fed. Rep. of Germany

[21] Appl. No.: 89,365

[22] PCT Filed: Nov. 22, 1986

[86] PCT No.: PCT/DE86/00477

§ 371 Date: Jul. 22, 1987

§ 102(e) Date: Jul. 22, 1987

[87] PCT Pub. No.: WO87/03174

PCT Pub. Date: Jun. 4, 1987

[30] Foreign Application Priority Data

Nov. 22, 1985 [DE] Fed. Rep. of Germany ....... 3541802

[51] Int. Cl.⁴ .......................... A23J 1/12; A23L 1/237
[52] U.S. Cl. ..................................... 426/656; 426/649; 426/655
[58] Field of Search ..................... 426/656, 649, 655

[56] References Cited

U.S. PATENT DOCUMENTS

| | | | |
|---|---|---|---|
| 2,414,299 | 1/1947 | Hall | 426/656 |
| 3,929,890 | 12/1975 | Pfister | 426/656 |
| 4,243,691 | 1/1981 | Mohlenkamp, Jr. et al. | 426/649 |
| 4,451,494 | 5/1984 | Roan | 426/649 |
| 4,650,856 | 3/1987 | Yagi et al. | 426/656 |
| 4,665,158 | 5/1987 | Armanet et al. | 426/656 |

FOREIGN PATENT DOCUMENTS 1071248  12/1965  United Kingdom ............... 426/656

*Primary Examiner*—Steven Weinstein
*Assistant Examiner*—Helen Pratl
*Attorney, Agent, or Firm*—Millen & White

[57] ABSTRACT

A dietetic food seasoning is claimed, characterized in that, for its production, vegetable proteins are hydrolyzed with 2 to 7.5 times the amount by weight of 15-30% by weight aqueous hydrochloric acid and/or phosphoric acid at 100° C. to 120° C., the hydrolyzate is optionally treated with active carbon, neutralized with 30-60% by weight aqueous potassium hydroxide solution until a pH value of 4-6.8 has been reached, the resultant mixture is optionally concentrated to a volume of 1.2 to 2.8 liters per kilogram of vegetable protein used, and filtered, after allowing to stand for at least two hours at 10° C. to 30° C.

20 Claims, No Drawings

PROCESS AND PRODUCT OF MAKING A VEGETABLE PROTEIN HYDROLYSATE FOOD SEASONING

The invention relates to dietetic food seasonings, as well as to a process for the production thereof.

Pulverulent dietetic food seasonings have been known. Thus, a seasoning free of sodium salt has been described in U.S. Pat. No. 4,243,691 (consisting of a hydrolyzate of vegetable proteins, potassium chloride, dipotassium hydrogen phosphate, glucose, inosine-5'-phosphoric acid and guanosine-5'-phosphoric acid) which is to serve as a table salt substitute.

However, there is a need for liquid dietetic seasonings that can be utilized as a substitute for the conventional soup seasonings containing sodium chloride—such as, for example, "Maggi" seasoning. The filtrates obtained according to the process of this invention are excellently suitable as substitutes for such liquid food spices. They exhibit the typical flavor of these seasonings and are surprisingly devoid of troublesome bitter aftertaste. Moreover, they are distinguished by a very long shelf life and show astonishingly good resistance against microbial contamination.

The precipitate, having a spicy flavor, obtained in the process of this invention exhibits, on the other hand, an aroma typical for this type, exhibits, contrary to expectation, no interfering aftertaste, either, and can be stored. Consequently, this precipitate is likewise suitable as a food seasoning.

In order to produce the food seasonings of this invention, it is possible, for example, to use, as the vegetable proteins, cohesive proteins (gluten), such as sticky proteins prepared from cereals (such as, for example, wheat or corn). Especially suited vegetable proteins are native cohesive proteins, such as, for example, the vital glutens by the firm of Emsland Staerke GmbH, 4459-Emlichheim. Additional vegetable proteins suitable for preparation of the seasonings of this invention are, for example, protein isolates from soybeans, cottonseeds, potatoes, peanuts, etc.

Hydrolysis of the vegetable proteins is conducted in ways well known to persons skilled in the art. Commercially available, concentrated hydrochloric acid and/or phosphoric acid can be used for hydrolysis, and the hydrolysis can be performed in a boiling solution. The hydrolysis is continued until at least 70%—preferably at least 90%—of the amide linkages of the vegetable protein have been split up. The hydrolysis lasts preferably 4-8 hours.

In order to suppress formation of humic acid and thus to improve flavor, this hydrolysis is suitably conducted in the presence of 1-3% by weight of a montmorillonite (such as, for example, floridin earths, fuller's earths, bentonite, hectorite).

After hydrolysis has taken place, the hydrolyzate is suitably treated with active carbon in order to remove undesirable accompanying substances. This treatment is advantageously performed at a temperature of 30° C. to 70° C., using for absorption preferably 2-7% by weight of active carbon, based on the vegetable protein employed.

Neutralization of the hydrolyzate must be performed so that local hot spots and overalkalinization, which have a deleterious effect on flavor quality, are avoided. Neutralization must be conducted with thorough agitation, and external cooling must be provided to take care that the reaction temperature does not rise above 40° C. Neutralization is finished once a pH value of 4 to 6.5 has been reached.

If hydrolysis is conducted in a highly concentrated solution, then potassium chloride is obtained after neutralization in the form of a precipitate. If this is not the case, then the mixture obtained after neutralization must be concentrated to such an extent that potassium chloride is separated. Preferably, the mixture is concentrated under vacuum with a pressure of 50-150 mbar to such a degree that, per kilogram of vegetable protein employed, there are present 1.2 to 2.8 liters of neutralized hydrolyzate. This hydrolyzate is allowed to stand for at least 2 hours at 10° C. to 30° C., and is filtered.

The thus-prepared filtrate is fully satisfactory with respect to flavor; moreover, it shows good shelf stability. For preparation of sales products, it can, if desired, be diluted, combined with flavor-ameliorating agents (such as acetic acid or spice extracts), and dispensed in bottles of a suitable size.

The example set forth below serves to provide a more detailed description of the invention.

EXAMPLE 100 g of vital gluten (manufacturer: Emsland Staerke GmbH, D-4459 Emlichheim) is introduced at room temperature into 300 g of 20% by weight aqueous hydrochloric acid, combined with 2 g of bentonite, and heated under agitation and reflux to 105° C. for 6.5 hours.

The mixture is cooled to 55°-60° C., combined under agitation with 4 g of active carbon ("Norit" CN-3; manufacturer: Chemviron, D-6900 Heidelberg), stirred for one hour at 55°-60° C., and filtered.

The filtrate is extensively concentrated under a vacuum of 80 mbar, combined with water until complete solution is obtained, and mixed under cooling to 30°-35° C. with 50% by weight aqueous potassium hydroxide solution until the pH value is 5.0.

Then the mixture is concentrated to 210 ml under a vacuum of 80 mbar, agitated for 6 hours at room temperature, filtered, and the liquid dietetic food seasoning is thus produced.

From the separated, moist-plastic sediment, 10% is withdrawn, predried under vacuum, comminuted, and the remainder of the sediment is dried by fluidized bed agglomeration by means of the "ad back" method, and can be utilized as a pulverulent dietetic seasoning.

I claim:

1. A dietetic food seasoning, comprising a vegetable protein hydrolysate preparable by hyrolyzing vegetable protein with 2 to 7.5 times its amount by weight of 15-30% by weight aqueous hydrochloric acid or phosphoric acid at 100° C. to 120° C.,
   neutralizing the hydrolysate with 30-60% by weight aqueous potassium hydroxide solution until a pH value of 4-6.8 is reached,
   allowing the neutralized hydrolysate to stand for at least two hours at 10° C. to 30° C., at a hydrolysate volume of 1.2 to 2.8 liters per kilogram of vegetable protein used whereby potassium salt precipitates, and then
   filtering the neutralized hydrolysate.

2. A dietetic food seasoning of claim 1, comprising a vegetable protein hydrolysate preparable by hydrolyzing vegetable protein with 2.4 to 4 times its amount by weight of 15-25% by weight aqueous hydrochloric acid at 100° C. to 115° C. for 4–8 hours.

3. A dietetic food seasoning of claim 2, wherein cohesive protein is used as the vegetable protein.

4. A process for the production of dietetic food seasoning of claim 3, further comprising
treating the hydrolysate with active carbon.

5. A process for the production of a dietetic food seasoning of claim 4, further comprising using cohesive protein as the vegetable protein.

6. A dietetic food seasoning of claim 1, wherein cohesive protein is used as the vegetable protein.

7. A dietetic food seasoning of claim 2, wherein the hydrolysate is treated with active carbon.

8. A process for the production of dietetic food seasoning according to claim 7, comprising performing the hydrolysis in the presence of 1–3% by weight of montmorillonites, based on the vegetable protein employed.

9. A dietetic food seasoning of claim 1, wherein the hydrolysate is treated with active carbon.

10. A process for the production of dietetic food seasonings, comprising
hydrolyzing vegetable proteins with 2 to 7.5 times their amount by weight of 15–30% by weight aqueous hydrochloric acid at 100° C. to 120° C.,
neutralizing the hydrolysate with 30–60% by weight aqueous potassium hydroxide solution until a pH value of 4–6.8 is reached,
allowing the neutralized hydrolysate to stand for at least two hours at 10° C. to 30° C. at a hydrolysate volume of 1.2–1.8 liters per kilogram of vegetable protein whereby potassium salt precipitates, and filtering the neutralized hydrolysate.

11. A dietetic food seasoning of claim 10, wherein at least 90% of the amide linkages have been split.

12. A process for the production of a dietetic food seasoning of claim 4, further comprising using cohesive protein as the vegetable protein.

13. A process for the production of a dietetic food seasoning of claim 10, wherein the hydrolysis is conducted until at least 70% of the protein amide linkages have been split.

14. A dietetic food seasoning of claim 1, wherein the vegetable protein has been hydrolyzed until at least 70% of its amide linkages have been split.

15. A dietetic food seasoning of claim 6, wherein the hydrolysate is treated with active carbon.

16. A dietetic food seasoning of claim 3, wherein the hydrolysate is treated with active carbon.

17. A process for the production of a dietetic food seasoning of claim 13, wherein at least 90% of the amide linkages have been split.

18. A dietetic food seasoning of claim 1, wherein prior to said standing step, the hydrolysate volume has been adjusted to said volume range.

19. A process for the production of dietetic food seasoning of claim 10, further comprising treating the hydrolysate with active carbon.

20. A process of claim 10, further comprising adjusting the volume of said hydrolysate to said range.

* * * * *